(12) United States Patent
DiRaimondo et al.

(10) Patent No.: US 7,032,047 B2
(45) Date of Patent: Apr. 18, 2006

(54) METHOD OF REGULATING USAGE AND/OR CONCESSION ELIGIBILITY VIA DISTRIBUTED LIST MANAGEMENT IN A SMART CARD SYSTEM

(75) Inventors: Sam Joseph DiRaimondo, Cary, IL (US); Ramy Peter Ayoub, Arlington Heights, IL (US); Michael Joseph Crowley, Oak Park, IL (US); Thomas Patrick McGovern, LaGrange Park, IL (US); Clark David Elmore, Hoffman Estates, IL (US); Steven Lee Mayes, Geneva, IL (US)

(73) Assignee: Motorola, Inc., Schaumburg, IL (US)

( * ) Notice: Subject to any disclaimer, the term of this patent is extended or adjusted under 35 U.S.C. 154(b) by 761 days.

(21) Appl. No.: 09/803,845

(22) Filed: Mar. 12, 2001

(65) Prior Publication Data

US 2004/0225776 A1     Nov. 11, 2004

(51) Int. Cl.
*G06F 13/38* (2006.01)
(52) U.S. Cl. ...................... 710/200; 710/311; 713/182; 713/192; 713/193
(58) Field of Classification Search ........ 713/200–202, 713/182–186, 160–161, 192–193; 235/380, 235/492, 375; 710/305–313, 63–64, 200, 710/220
See application file for complete search history.

(56) References Cited

U.S. PATENT DOCUMENTS

| | | | | |
|---|---|---|---|---|
| 4,882,675 A | * | 11/1989 | Nichtberger et al. | 705/14 |
| 5,007,089 A | * | 4/1991 | Matyas et al. | 380/280 |
| 5,012,074 A | * | 4/1991 | Masada | 235/379 |
| 5,289,369 A | * | 2/1994 | Hirshberg | 705/13 |
| 5,459,304 A | * | 10/1995 | Eisenmann | 235/380 |
| 5,461,217 A | * | 10/1995 | Claus | 235/380 |
| 5,559,885 A | * | 9/1996 | Drexler et al. | 235/380 |
| 5,578,808 A | * | 11/1996 | Taylor | 235/380 |
| 5,856,659 A | * | 1/1999 | Drupsteen et al. | 235/380 |
| 5,884,271 A | * | 3/1999 | Pitroda et al. | 705/1 |
| 6,023,762 A | * | 2/2000 | Dean et al. | 713/193 |
| 6,068,183 A | * | 5/2000 | Freeman et al. | 235/375 |
| 6,170,742 B1 | * | 1/2001 | Yacoob | 235/375 |
| 6,215,863 B1 | * | 4/2001 | Bennett et al. | 379/221.09 |
| 6,226,744 B1 | * | 5/2001 | Murphy et al. | 713/200 |
| 6,257,486 B1 | * | 7/2001 | Teicher et al. | 235/380 |
| 6,374,356 B1 | * | 4/2002 | Daigneault et al. | 713/200 |
| 6,450,407 B1 | * | 9/2002 | Freeman et al. | 235/492 |
| 6,463,537 B1 | * | 10/2002 | Tello | 713/182 |
| 6,516,357 B1 | * | 2/2003 | Hamann et al. | 710/2 |
| 6,556,680 B1 | * | 4/2003 | Leonardi | 380/247 |
| 6,601,771 B1 | * | 8/2003 | Charrin | 235/492 |
| 6,763,463 B1 | * | 7/2004 | Guthery | 713/193 |

FOREIGN PATENT DOCUMENTS

EP             448369 A2 *   9/1991

* cited by examiner

*Primary Examiner*—Tim Vo
*Assistant Examiner*—Raymond N Phan
(74) *Attorney, Agent, or Firm*—Terri S. Hughes; Valerie M. Davis (57) ABSTRACT

A method of regulating usage and/or concession eligibility in a smart card system is described herein. A card acceptance location (110) detects a presence of a smart card and determines its identification code. The card acceptance location (110) checks the identification code against a list stored locally at the card acceptance location (110). The card acceptance location (110) received the list from a second device. If the identification code of the smart card is listed on the list, the card acceptance location (110) performs an action on the smart card.

17 Claims, 9 Drawing Sheets

METHOD OF REGULATING USAGE AND/OR CONCESSION ELIGIBILITY VIA DISTRIBUTED LIST MANAGEMENT IN A SMART CARD SYSTEM

FIELD OF THE INVENTION

The present invention relates generally to a method of regulating smart card usage and/or concession eligibility in a smart card system.

BACKGROUND OF THE INVENTION

Most smart card systems employ a stored value concept. This means that the smart card has the electronic value stored in its internal memory. These smart cards can be purchased with electronic cash pre-loaded. Electronic cash value can be added to these smart cards at kiosks by the cardholder via credit cards, debit cards, cash, etc. These kiosks are generally referred to as add value stations. The disadvantages to these systems are that they require convenient and multiple add value stations available to the cardholder in order to gain acceptance. Moreover, there is added cost to the system owner to purchase, install and maintain these stations, as well as the credit, debit and cash handling costs. The reloading of these smart cards is left at the discretion of the cardholder, that is to say that if the initial value of the purchased smart card is used up and the cardholder cannot access an add value station, the smart card system will simply deny access to the system unless there is the sufficient electronic value stored on the smart card.

In the event that a non-anonymous, stored-value smart card is lost or stolen, the cardholder must report the smart card to a customer service center and a replacement card is sent to the cardholder. A disadvantage to this model is that once a smart card is reported lost or stolen, the smart card is permanently inactivated even if the smart card is subsequently found since the value of the lost/stolen card has been duplicated on the replacement card. In anonymous stored-value smart cards, there is nothing that can be done to reimburse the cardholder for the lost value on the lost/stolen smart card since there is no link between the smart card and the cardholder. In non-stored value smart card systems, where the smart card is linked to a cardholder's bank account to make automatic deductions, there are numerous business scenarios where a card may be deemed temporarily ineligible to participate in the system. In these systems, permanently disabling the smart card would greatly inconvenience the cardholder and represent a significant cost to the system operators/owners.

Thus, there exists a need for regulating smart card usage in smart card systems without burdening the cardholder with constant monitoring and replenishing the value on the card and without having the system owners bear unnecessary costs.

BRIEF DESCRIPTION OF THE DRAWINGS

A preferred embodiment of the invention is now described, by way of example only, with reference to the accompanying drawings in which.

DETAIL DESCRIPTION OF THE PREFERRED EMBODIMENT

Figure 1:
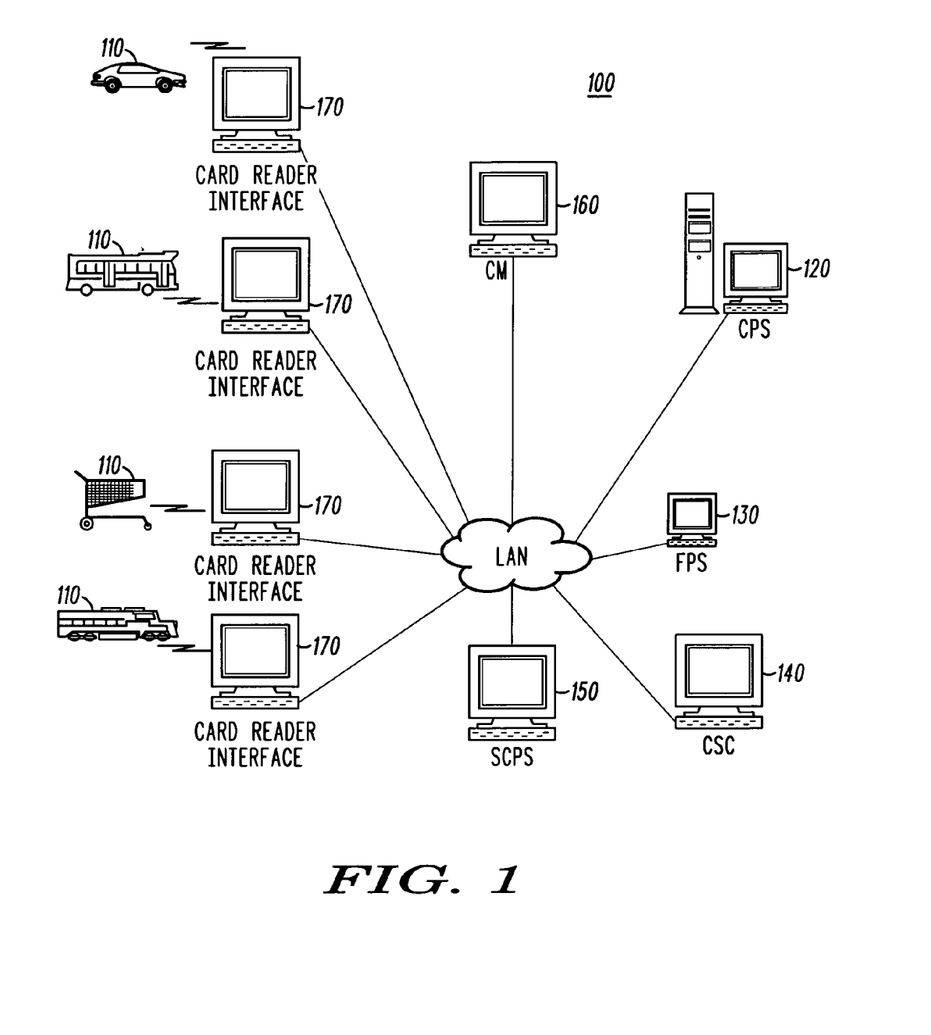
FIG. 1 illustrates a diagram of a smart card system for regulating smart card usage in accordance with the preferred embodiment of the present invention.

As shown in FIG. 1, a smart card system 100 comprises front office components and back office components. A discussion of the front office components will be discussed first. Examples of front office components include the smart card and the card acceptance location 110. The card acceptance location 110 comprises a card reader that reads the smart cards when presented to it, and memory in which to record transactions and store operating and card information. The card acceptance location 110 may be mobile/portable location (e.g., bus, train, taxi, etc.), and the reader may be a hand held device or semi-permanent device installed at the card acceptance location 110. When the card acceptance location 110 is mobile/portable, it is typically connected to the back office components in an off-line mode. The card acceptance location 110 may also be a fixed location, such as retail stores, and connected to the back office components in an on-line mode. The card acceptance location 110 is responsible for creating smart card transactions and forwarding these transactions to the back office components for processing, including settlement and clearing of these transactions.

Presentation of a smart card to a card acceptance location 110 allows the card acceptance location 110 to power the smart card and communicate securely with it at a set frequency. During this communication, commands and responses are securely passed back and forth between the smart card and the card acceptance location 110. During the initial stages of communication, the smart card and the card acceptance location 110 identify each other in an unsecure manner. This initial identification allows the card acceptance location 110 and the smart card to quickly identify each other as components on the same system 100, as well as have the opportunity to check the component status of each device. After such identification, a secure verification of the smart card and card acceptance location 110 is performed. This verification process is commonly known as a three pass mutual authentication. The three pass mutual authentication is more time consuming than the initial identification process, and along with the secure data communication method, is responsible for a large portion of the total transaction time. Once the mutual authentication has successfully completed, specific smart card application commands are performed. For example, the smart card transaction is recorded in a transaction log file on the smart card and a transaction record is generated, stored in the card acceptance location's memory, and later forwarded to the back office components for processing.

The smart card is known to the system 100 by a unique identification identifier ("UID") stored on the smart card in electronic form. This UID is electronically linked in the smart card system to the cardholder. Based on this identification, the concept of a hot list is introduced in accordance with the present invention. The hot list is a collection of smart card UIDs that the card acceptance location 110 must take an action on when the UID of the presented smart card is matched with an entry on the hot list. In the preferred embodiment of the present invention, the hot list is stored locally at the card acceptance location 110 and updated in a batch format by the back office components on a periodic basis, e.g., hourly, daily, weekly, monthly, etc. Preferably, the hot list comprises black list items and green list items. The black list items represent smart card UIDs that should be disabled when the smart card is presented to any of the card acceptance locations 110 in the smart card system 100, thereby denying access to the system 100. The green list items represent smart card UIDs that have previously been deemed ineligible to participate in the system, placed on the black list and disabled, and is now ready to be re-enabled when the smart card is presented to any of the card acceptance locations 110, thereby re-gaining access to the system 100.

In accordance with the preferred embodiment of the present invention, a smart card UID is added to the hot list as a black list item, for example, when the smart card is reported lost or stolen. Another example is when the cardholder's account that the smart card is linked to falls below a predetermined threshold balance or is delinquent. Typically, the predetermined threshold balance is established by a set of criteria determined by the owner of the smart card system, but can also be established by other means.

With respect to green list items, a smart card UID is added to the hot list as a green list item, for example, when the smart card that was previously reported as lost or stolen is found. Another example is when the cardholder's account balance has been replenished, thus meeting or exceeding the predetermined threshold balance of the owner of the smart card system. The advantage of this system is that it allows a customer to quickly resume smart card transactions after he/she was temporarily deemed ineligible from participating.

In accordance with the preferred embodiment of the present invention, the back office components may limit the sizes of the black list and green list to fit the memory of a card acceptance location. It may limit the list sizes by geographic location of the card acceptance location, the value of a card with a particular UID, the computed potential fraud value of the card, or any combination of these and other methods.

Now lets turn the discussion to the back office components. Examples of the back office components are a central processing component 120, a financial processing component 130, a customer service component 140, and a smart card processing component 150. The smart card system 100 may also comprise a configuration manager 160 and a card reader interface device 170. The central processing component 120 is responsible for consolidating transactions from service providers. In certain non-stored value smart card systems, the central processing component 120 may rate the transaction. The central processing component 120 may also have the responsibility of monitoring transactions for possible anomalies that result from fraudulent card usage. For example, the central processing component 120 will detect when two transactions occur at the same time, with the same smart card UID, at different locations. As such, the central processing component 120 assists in fraud protection for the cardholder.

The financial processing component 130 is responsible for settling the transactions between the cardholders and the service providers. In stored value systems, the financial processing component 130 tallies all transactions belonging to a specific service provider and transfers the correct funds to the service provider. In non-stored value systems, the financial processing component 130 tallies all transactions owed to a specific service provider by a respective cardholder, deducts the amounts from the respective cardholder's bank account, and transfers the equivalent amount to the service provider to settle the transaction. Thus, the smart card system 100 in accordance with the preferred embodiment of the present invention is based on the automatic revaluation of linked financial accounts. That is to say that there is no electronic cash value stored on the smart card. The cardholder provides the system with a bank account number that funds are initially drawn out of and when the balance of the smart card account gets to a preset low level, the system automatically initiates a transfer of funds from the cardholder's bank account to the smart card account maintained by the smart card system owner. The financial processing component 130 must constantly monitor the financial status of the cardholders to ensure that they are able to pay for their accrued transactions. An advantage of this system to the system owner is that there is no add value stations required. Additionally, there is no burden on the cardholder to reload electronic cash, thus making participation in the system uninterrupted.

The customer service component 140 of the smart card system 100 is responsible for interfacing with the cardholder in handling questions, complaints, and issues. One specific function of the customer service component 140 is to allow the cardholders to report the physical status of their smart cards should the physical status change. For example, the cardholders will report to the customer service component 140 that their smart card is lost, stolen or found.

The smart card processing component 150 of the smart card system 100 is responsible for monitoring the conditions that would make a smart card eligible or ineligible to participate in the system 100 based on the criteria of the service providers, system operators, system owners, or any combination thereof. In the preferred embodiment of the present invention, the smart card processing component 150 monitors the fraudulent smart card usage data from the central processing component 120, the cardholder financial status data from the financial processing component 130, and the smart card physical status from the customer service component 140, in determining the eligibility of the smart card to participate in the system 100. From this information, the smart card processing components 150 builds the hot list.

The configuration manager 160 combines the generated hot list with other related operational data and forwards the data to a card reader interface device 170 (e.g., a central computer) for which that data is intended.

The card reader interface device 170 communicates with numerous card acceptance locations 110 in the system 100. All card acceptance locations 110 connected to the card reader interface device 170 may or may not share common operational data, including the hot list. The card reader interface device 170, however, ensures transmission of the correct operational data to the respective card acceptance locations 110. The card acceptance locations 110 are mapped to a card reader interface device 170 based on geographical proximity to the card reader interface device 170, as well as other factors, such as the service providers who are using the card acceptance locations 110, the system operators who are maintaining the card acceptance locations 110, and the system owners who own the card acceptance locations 110. Notwithstanding the above, security reasons, however, may dictate that card acceptance locations 110 in different retail stores may not be mapped to a single card reader interface device 170.

On either a periodic basis, or on demand, the smart card processing component 150 of the system 100 builds the hot list and forwards the hot list to—the configuration manager 160 for inclusion with other operational data to be sent to the card acceptance locations 110 via the card reader interface device 170. On a timed basis, or whenever the card acceptance location 110 comes on-line, the card reader interface device 170 forwards the operational data, which includes the hot list, to the intended card acceptance locations 110. Preferably, the card acceptance locations 110 acknowledge successful receipt of the hot list and other operational data, and no further attempts are made by the system 100 to transmit the lists to these particular card acceptance locations 110 until updated operational data is generated. Each card acceptance location 110 stores the most recent operational data in its memory.

Now that each card acceptance location 110 has locally stored operational data, the card acceptance location 110 can operate in a standalone mode to create smart card transactions for smart cards presented to it for transaction purposes. Smart card transactions include, but are not limited to, debit transactions, credit transactions, disable transactions and enable transactions.

In operation, when a smart card is presented to a card acceptance location 110, the card acceptance location 110 checks the state of the smart card during initial identification. In the preferred embodiment, a status bit in the system file indicates the state of the smart card. The smart card has a file system that has critical files stored on it to interact with the card acceptance location 110 to create a transaction record. The transaction log file is one of these critical files. Additionally, critical data from the system file is sent to the card acceptance location 110 during the initial communication between the card acceptance location 110 and the smart card, prior to the mutual authentication stage. This data quickly indicates to the card acceptance location 110 the status of the smart card prior to the secure and more time consuming mutual authentication process. Usage of both the system file and the transaction log file is used to comprise a solution that would allow a card acceptance location 110 to disable and/or enable a smart card. Thus, the card acceptance locations 110 disable and enable smart cards based on the status information of the smart card and the hot list stored locally.

If the smart card status bit indicates that the smart card is presently enabled, the card acceptance location 110 checks the black list items in the hot list for a match. If a match is found, the card acceptance location 110 sets the status bit to indicate that this smart card is disabled and blocked from further use until this condition is cleared. Further, the card acceptance location 110 instructs the smart card to block all access to the transaction log file until further notice. The card acceptance location 110 creates a disable transaction and forwards it to the SCPS 150 to purge the entry from the black list items in the hot list. The entry is purged from the hot list once the card acceptance location 110 takes action on the smart card in order to keep the size of the hot list to a minimum, and prevents the list from growing without bound. If a match is not found, the card acceptance location 110 performs the desired transaction. Depending on the application, the card acceptance location 110 may generate audio and/or visual indicators indicating that that transaction was successfully completed. The card acceptance location 110 forwards the transaction record to the back office components for further processing, settlement and clearing. If in the process of performing the transaction, the card acceptance location is blocked by the smart card from accessing its transaction log file (i.e., the status bit and the blocking status are inconsistent), a fraud transaction is created and transmitted to the back office components, the status bit is set to disabled, and the cardholder is denied service/product. This is in the unlikely event that a user will be able to independently read the file system, defeat the mutual authentication, and change the status bit, in an attempt to re-enable the smart card.

If the smart card status bit indicates that the smart card is presently disabled, the card acceptance location 110 checks the green list items on the hot list. If a match is found, the card acceptance location 110 changes the status bit in the system file and instructs the smart card to unblock access to the transaction log file. The card acceptance location 110 creates an enable transaction and performs the desired transaction. Depending on the application, the card acceptance location 110 may generate audio and/or visual indicators indicating that the transaction was successfully completed. The card acceptance location 110 forwards the transactions to the back office components for processing and purging the entry from the green list items on the hot list. If in the process of unblocking the smart card the card acceptance location finds that the smart card has already been unblocked (i.e., the status bit and the blocking status are inconsistent), a fraud transaction is created and transmitted to the back office components, the card is blocked and the status bit is set to disabled. The cardholder will be denied service/product at this point. Again, this is in the unlikely event that a user was able to independently defeat mutual authentication and unblock the smart card, in an attempt to re-enable the smart card. If a match is not found, the card acceptance location 110 indicates that this smart card is invalid for transaction use. Preferably, the card acceptance location 110 generates audio and/or visual indicators indicating that this was a failed transaction, thus denying access to the system 100.

In accordance with the preferred embodiment of the present invention, all card acceptance locations 110 in the smart card system 100 need not be synchronized with the same version of the hot list nor must they behave identically to each other. Further, the black list items and the green list items are preferably stored in separate files in order to minimize the number of entries that each UID of the presented smart card has to be compared to.

Figure 2A:
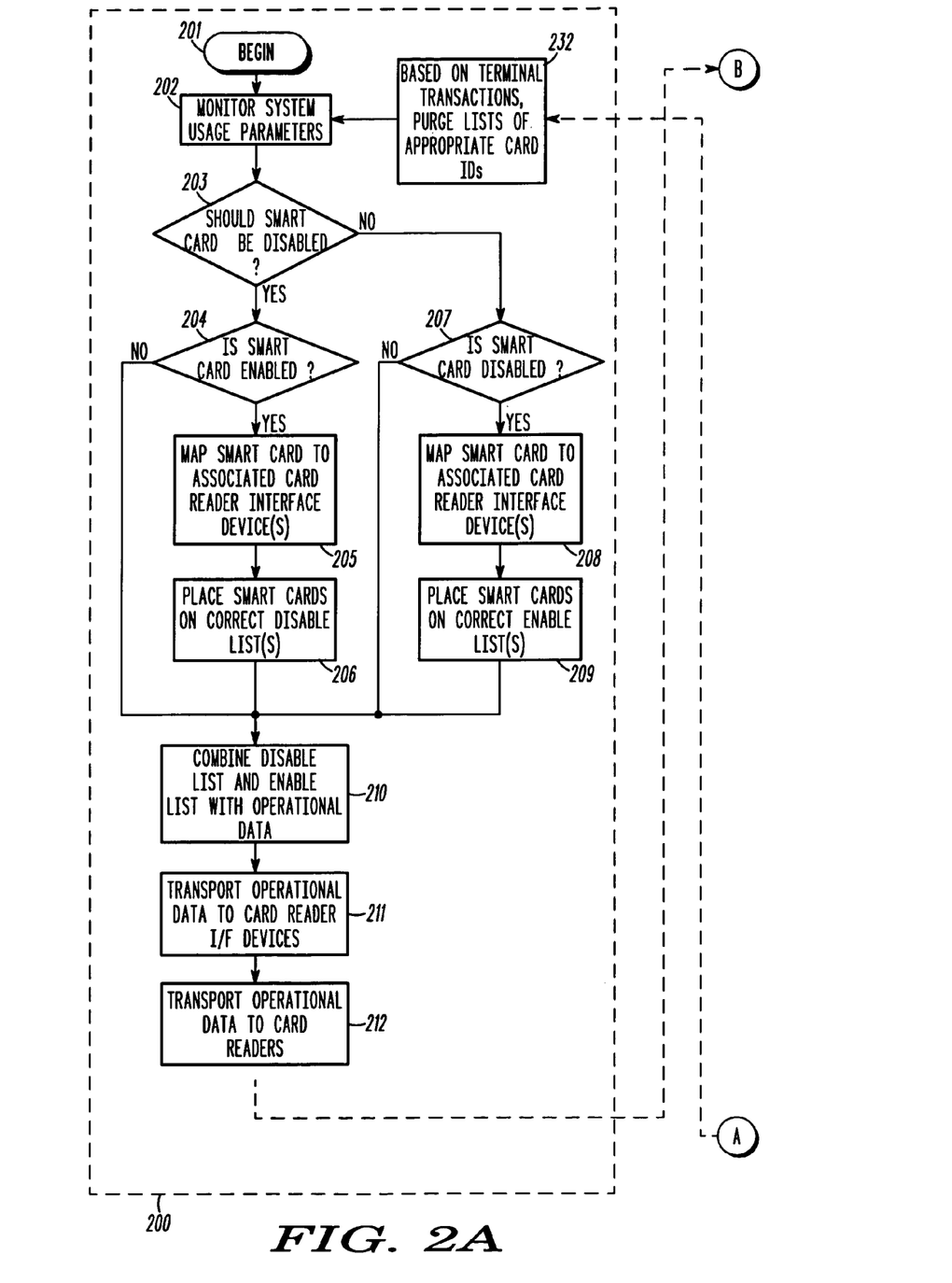
FIGS. 2A and 2B illustrate a flow chart depicting the algorithm used to determine the eligibility of a smart card to participate in the system in accordance with the preferred embodiment of the present invention.
Figure 2B:
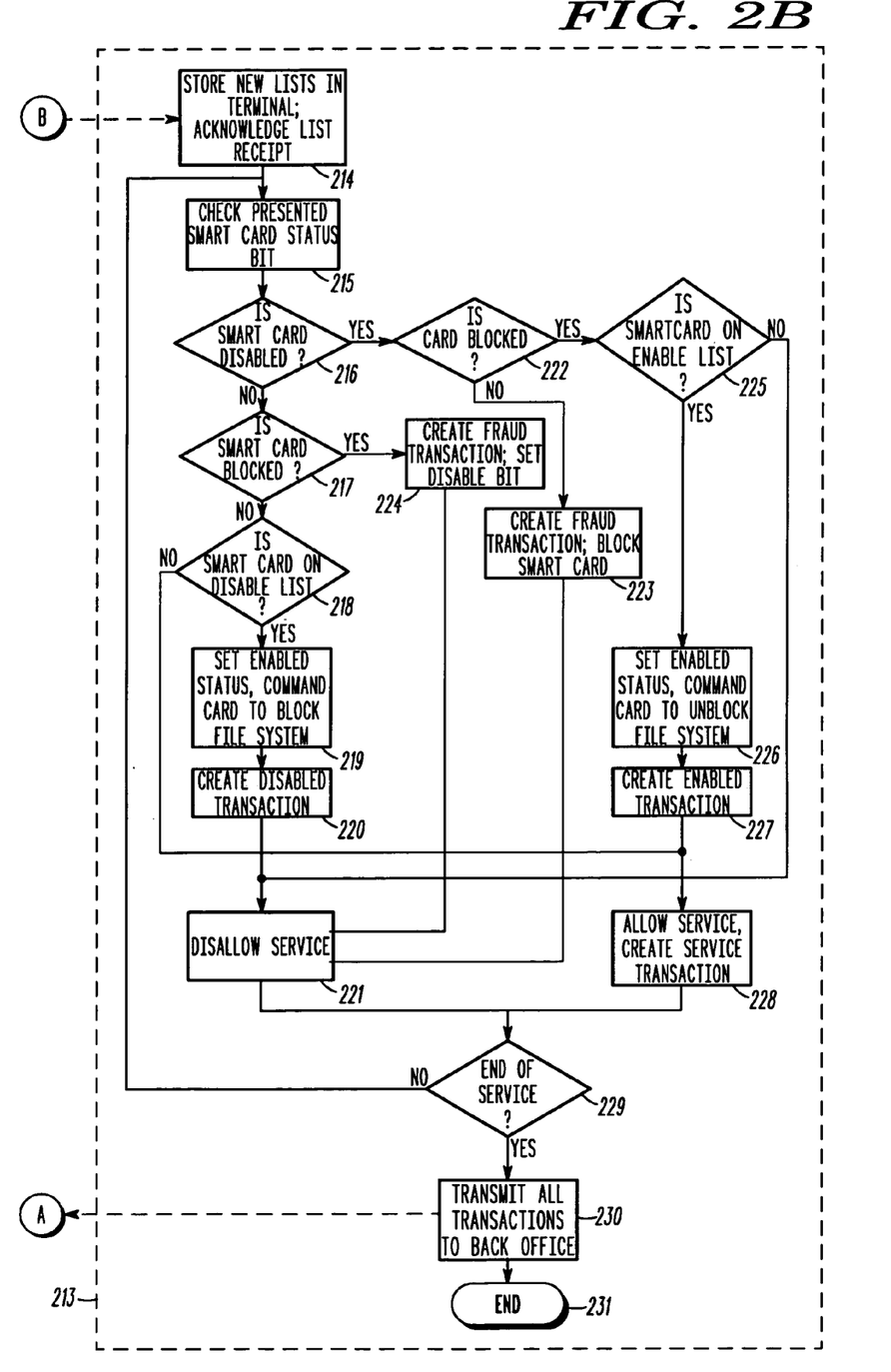

FIGS. 2A and 2B illustrate a flow chart depicting events of the preferred embodiment for regulating smart card usage (e.g., disablement and enablement of smart cards), or in other words, the algorithm used to determine the eligibility of a smart card to participate in the system 100. Processing begins 201 in the back office system 200, where a computer and database system monitors 202 the usage parameters of each smart card. The back office system 200 determines 203 whether a particular smart card should be disabled. The particular reasons for disabling a smart card in the system may be that the cardholder has exceeded the financial limits prescribed for card usage, that the cardholder has reported the card lost or stolen, or any other reason codified in the business rules of the particular system.

If the back office system 200 determines that the smart card should be disabled, it checks 204 to determine whether the smart card is currently enabled. If the smart card is not currently enabled, as determined from records in the back office's database, the back office system 200 proceeds to a combination step 210. If the smart card is currently enabled, the back office system 200 determines 205 which card acceptance location(s) 213 it should associate with the card in order to transmit to the appropriate card acceptance location(s) 213 a list containing which cards should be disabled. The back office system 200 records 206 the UID of the smart card on the disable list(s) of the card acceptance location(s) 213 it determined in 205, and then combines 210 disable and enable lists with other operational data.

If the back office system 200 determines that the smart card should not be disabled 203, it determines whether the smart card is already currently disabled 207, as represented in the database of the back office system 200. If the smart card is not disabled, processing proceeds at the combination step 210. If the smart card is disabled, the back office system 200 determines 208 which card acceptance location(s) 213 it should associate with the card in order to transmit to the appropriate card acceptance location(s) 213 a list containing which cards should be enabled. The back office system 200 records 209 the UID of the smart card on the enable list(s) of the card acceptance location(s) 213 it determined in 208, and then combines 210 disable and enable lists with other operational data.

During the combination step 210, the back office system 200 may determine that the combined enable list(s) and disable list(s) exceed the memory size of the target card acceptance location(s). If this occurs, the back office system may limit the sizes of the black list and green list to fit the memory of a card acceptance location(s). It may limit the list sizes by geographic location of the card acceptance location, the value of a card with a particular UID, the computed potential fraud value of the card, or any combination of these and other methods. In computing the potential fraud value of a card, the back office system 200 may take into account the associated debit or credit value of a card, the recentness of use of the card after the cards being reported lost or stolen, the remaining transaction value of the card, or any combination of these or other values associated with the card, combined with parameters representing the business rules of the system 100 operator.

After combining 210 enable lists and disable lists with other operational data, the back office system 200 transmits 211 the information to card reader interface devices for further transmission 212 to card acceptance locations 213. In some embodiments of the invention, transmission to card reader interface devices is omitted, and transmission 212 is made directly to the card acceptance locations 213.

The card acceptance locations stores 214 the enable and disable lists and acknowledges their receipt to the back office system 200. When a smart card is presented to the card acceptance location, the card acceptance location checks 215 the smart card status bit. If, according to the status bit, the smart card is disabled 216, the card acceptance location 213 further checks 222 whether the smart card file system is blocked. If the smart card file system is not blocked (i.e., the status bit is not consistent with the blocking status), the card acceptance location 213 determines that a fraud has occurred, creates 223 a fraud transaction, blocks the smart card file system, and disallows 221 the requested transaction.

If the smart card status bit indicates the card is disabled 216 and the smart card file system is blocked 222 (i.e., the status bit and the blocking status are consistent), the card acceptance location 213 determines 225 whether the UID of the smart card is on an enable list. If the UID of the smart card is not 225 on the enable list, the card acceptance location 213 disallows 221 the requested service/transaction. If the UID of the smart card is on the enable list 225, the card acceptance location 213 sets 226 the smart card enable bit and commands the smart card to unblock its file system. The card acceptance location 213 then creates 227 an enabled transaction, allows 228 the requested service, and creates a corresponding service transaction.

If the smart card status bit indicates 216 that the smart card is enabled, but the card acceptance location 213 determines 217 that the smart card file system is blocked (i.e., the status bit and the blocking status are not consistent), the card acceptance location 213 creates 224 a fraud transaction, sets the smart card disable bit, and disallows 221 the requested service/transaction. If the smart card status bit indicates 216 that the smart card is not disabled, and the card acceptance location 213 determines 217 that the smart card file system is not blocked, then the card acceptance location 213 determines 218 whether the UID of the smart card is present on the disable list. If the UID of the smart card is not 218 on the disable list, the card acceptance location 213 allows 228 the requested service and creates a corresponding service transaction. If the UID of the smart card is 218 on the disable list, the card acceptance location 213 sets 219 the smart card's disable bit and commands the smart card to block the smart card file system. The card acceptance location 213 creates 220 a corresponding disabled transaction and disallows 221 the requested service.

When the card acceptance location is at the end of its service period 229, it transmits all service, enable and disable transactions 230 to the back office system 200, and ends 231 the cycle. At the back office system, transmitted transactions are used to purge 232 the enable and disable lists of smart card UIDs. If the card acceptance location is not at the end of its service period 229, it continues to check 215 the status of presented smart cards.

Figure 3:
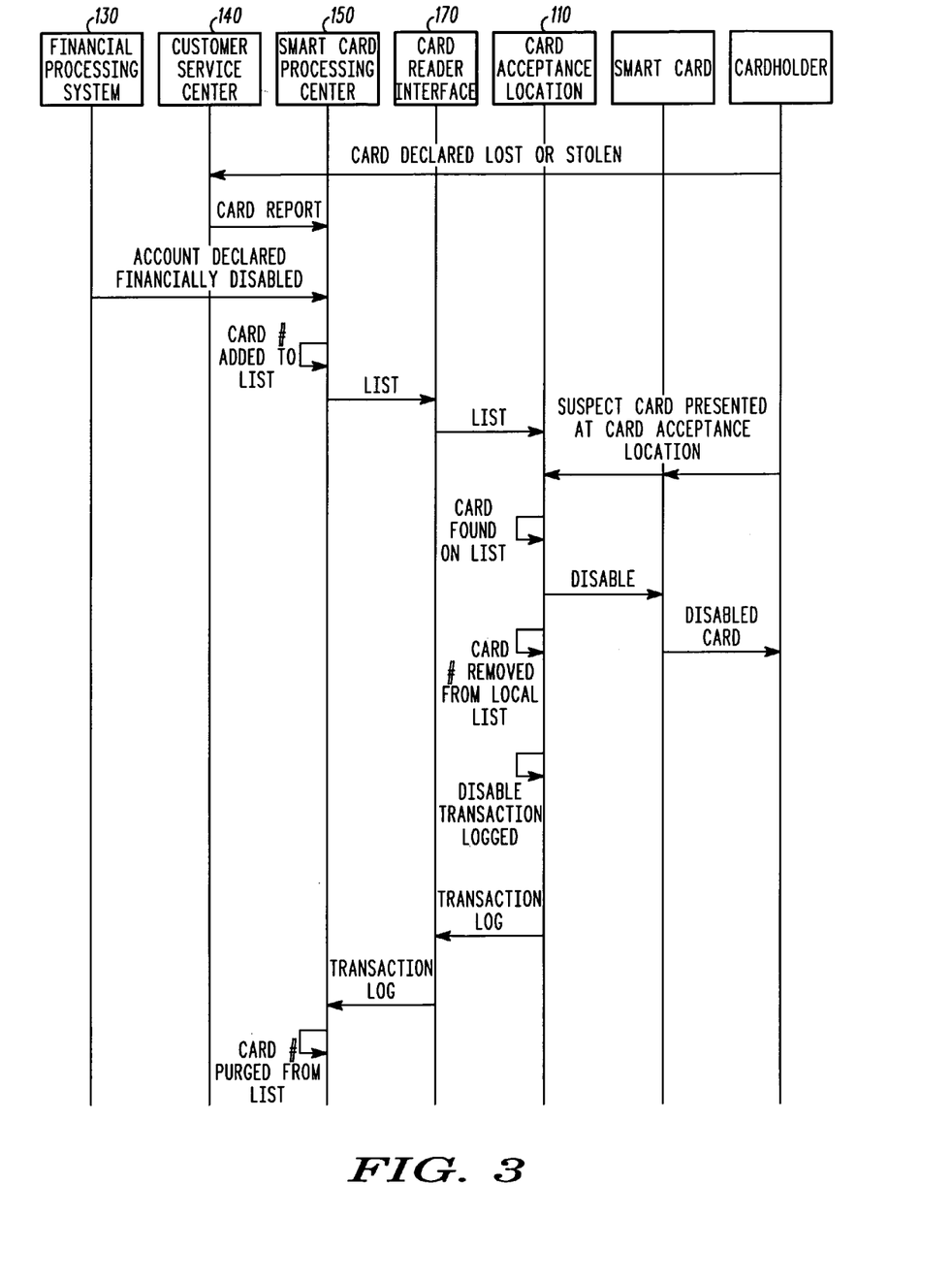
FIG. 3 illustrates a bounce diagram for disabling a smart card in accordance with the preferred embodiment of the present invention.
Figure 4:
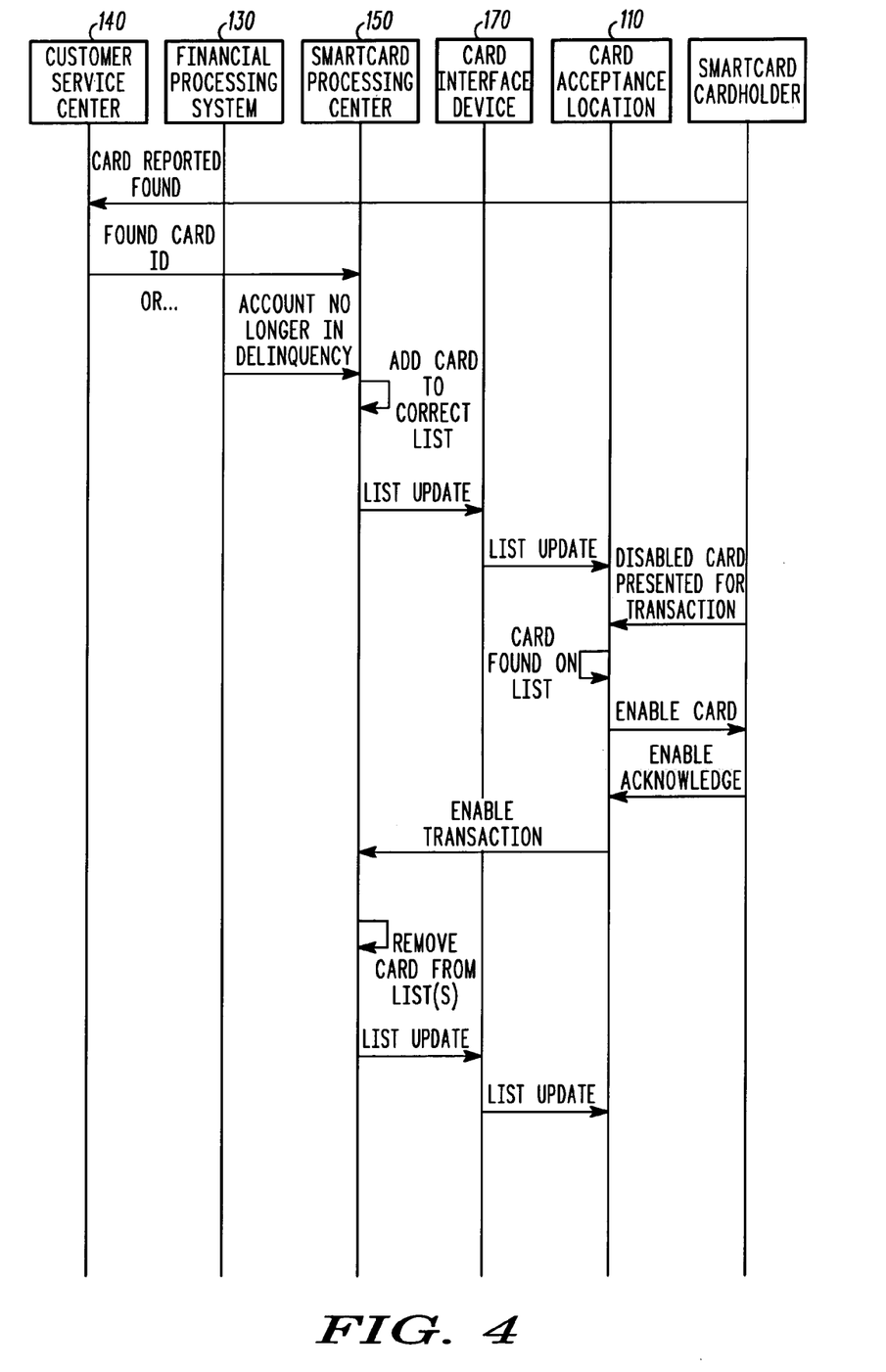
FIG. 4 illustrates a bounce diagram for enabling a smart card in accordance with the preferred embodiment of the present invention.

FIGS. 3 and 4 illustrate bounce diagrams in accordance with the preferred embodiment of the present invention. FIG. 3 illustrates the bounce diagram for disabling a smart card, and FIG. 4 illustrates the bounce diagram for enabling a smart card. With reference to the above description and FIGS. 1 and 2, FIGS. 3 and 4 are self-explanatory and will not be described in detail.

Figure 5:
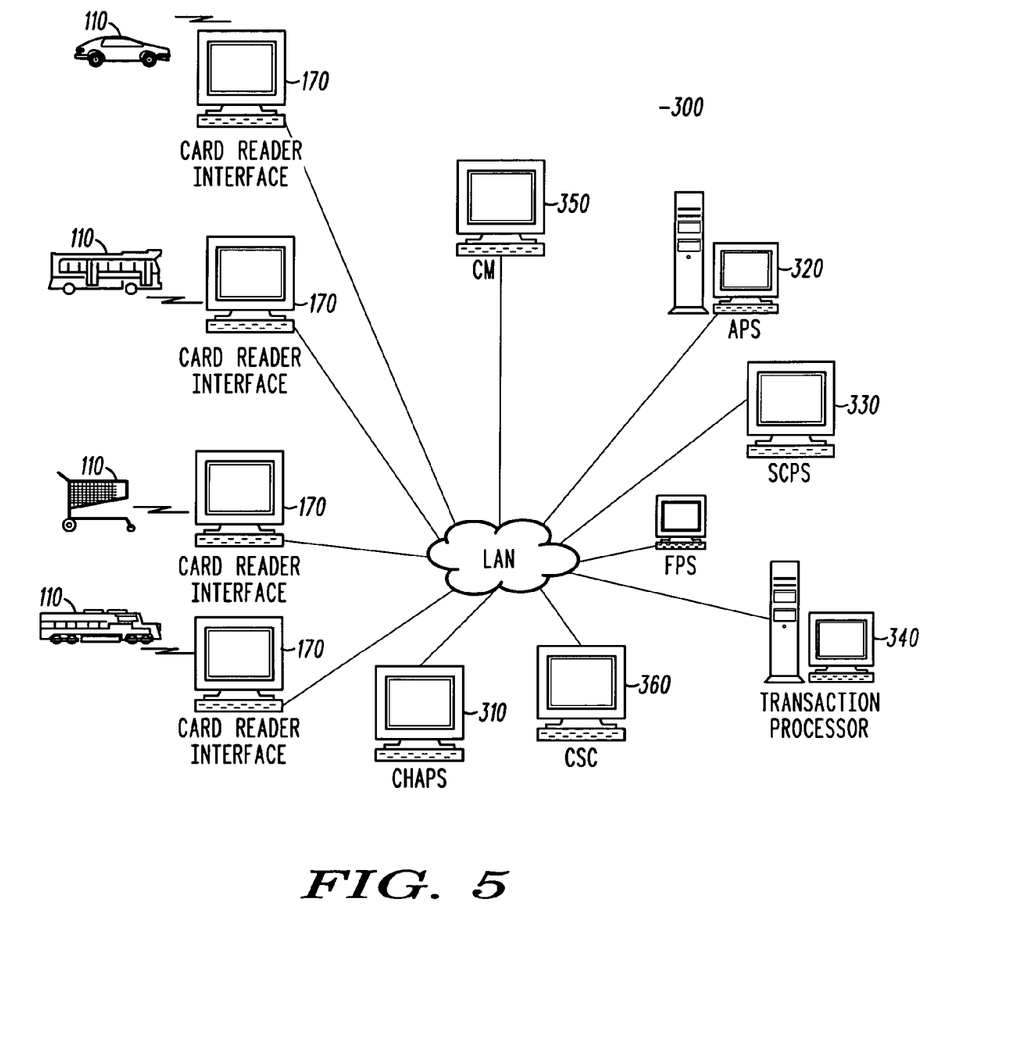
FIG. 5 illustrates a diagram of a smart card system for regulating concession eligibility in accordance with an alternative embodiment of the present invention.

An alternative embodiment of the present invention is illustrated in FIG. 5. In the alternative embodiment, the front office components are responsible for updating the smart cards with any cardholder concessions and loyalty programs that should be placed on the smart cards. The back office components are responsible for monitoring the concession and/or loyalty program eligibility as well as apply the concession and loyalty programs to smart card transactions.

In accordance with the alternative embodiment of the present invention, the back office components may comprise a cardholder account processing system ("CHAPS") 310, an account processing system ("APS") 320, a SCPS 330, a transaction processor 340, and a configuration manager 350. In the alternative embodiment, the CHAPS 310 is the back office server component responsible for monitoring the conditions that would make a smart card user eligible or ineligible for concessions and loyalty programs, as defined by the service providers, smart card system operators, and/or smart card system owners. For example, the CHAPS 310 automatically grants senior discount concessions to cardholders that reach a predetermined age by monitoring the current age of the cardholder. The CHAPS 310 may also monitor customer concession status. The CHAPS 310 is dedicated to monitoring the variable number of events and statuses that should be considered in determining the cardholder's concessions in the system 300. In some smart card systems, there may be multiple service providers (retailers, transit systems, etc.) that incorporate card acceptance locations as payment collection points in their businesses. Each service provider has well defined criteria determining concession and loyalty program eligibility in the smart card system. In addition, there may be separate smart card system operators and smart card system owners that define their own loyalty programs to reward smart card usage within their system. The CHAPS 310 monitors all the necessary criteria set by the service providers, system operators, and/or system owners to regulate concession and loyalty program eligibility.

The APS 320 is responsible for monitoring the conditions that would make an account owner eligible/ineligible for loyalty programs that are available to the account owner, as defined by the service providers, smart card system operators, and/or smart card system owners. The account owner has financial responsibility for the smart cards that are issued to his/her account. The account owner does not necessarily have to be the cardholder (e.g., a parent paying for the service (e.g., public transportation) for his/her child (cardholder), etc.).

The SCPS 330 is responsible for building the cardholder concession and loyalty lists that must be transmitted to the card acceptance locations, via the card reader interface device. The SCPS 330 must determine which concessions and loyalty programs/parameters should go on the smart cards, and monitor for any changes effected by the CHAPS 310.

The transaction processor 340 is responsible for rating the transactions as received from the front office. For each concession and loyalty program granted the cardholder and account owner, the transaction processor 340 may, for each transaction, price the transaction at full price/fare, at a reduced price/fare, or refund a part of or the whole price/fare.

The configuration manager 350 is responsible for combining the generated concession and loyalty lists with other card acceptance location related configuration data and forwarding the configuration data, including the generated lists, to the correct card reader interface device. As described above in the preferred embodiment, the card reader interface device is used to facilitate data communications with the card acceptance locations which may be a mobile location, such as a bus or train, and connected to the rest of the system in an off-line mode, or may be a fixed location, such as a retail store, and connected to the rest of the system in an on-line mode.

The card acceptance locations are responsible for creating the smart card transactions, and forwarding these transactions to the card reader interface device that in turn forwards them to the CHAPS 310 for concession and loyalty processing that is required for the settlement and clearing of these transactions. In some cases, the card acceptance locations may forward these transactions directly to the CHAPS 310.

Smart card transactions include regular debit transactions for usage that this card acceptance location has accrued during the operational day use, as well as smart card concession/loyalty update transactions. The concession/loyalty update transactions serve the purpose to indicate to the CHAPS 310 that a smart card has been updated with the latest concessions. This allows the CHAPS 310 to purge the UID of the smart card from the concession list. This keeps the concession list size down to a minimum, and stops the list from growing without bound.

On either a periodic or on-demand basis, the CHAPS 310 reviews user eligibility for concessions and loyalty programs based on the criteria dictated by the service provider, system operator, and/or system owner. Likewise, for systems where the concessions and loyalty program/parameters are stored on the card, the CHAPS 310 must be capable of generating list(s) containing all cards that had a change of concessions, loyalty programs, or loyalty program parameters, based on the criteria dictated by the service provider. Once these lists are generated, they are combined with card acceptance location configuration/operational data (if any exists) and are routed to the destination card acceptance locations. The card acceptance locations acknowledge successful receipt of the lists, and no further attempts are made by the system 300 to transmit the lists to these particular card acceptance locations. Once a change is made to the concessions and loyalty programs, the transaction processor 340 will consider the new concessions and/or loyalty programs/parameters in determining the price of the service/product purchased by the cardholder. Any updates to the smart card concession status, loyalty programs, or loyalty program parameters are made to the smart card during the presentation of the smart card to the card acceptance location. Any new transactions effected by the cardholder will incorporate the new concessions and loyalty programs.

Figure 6A:
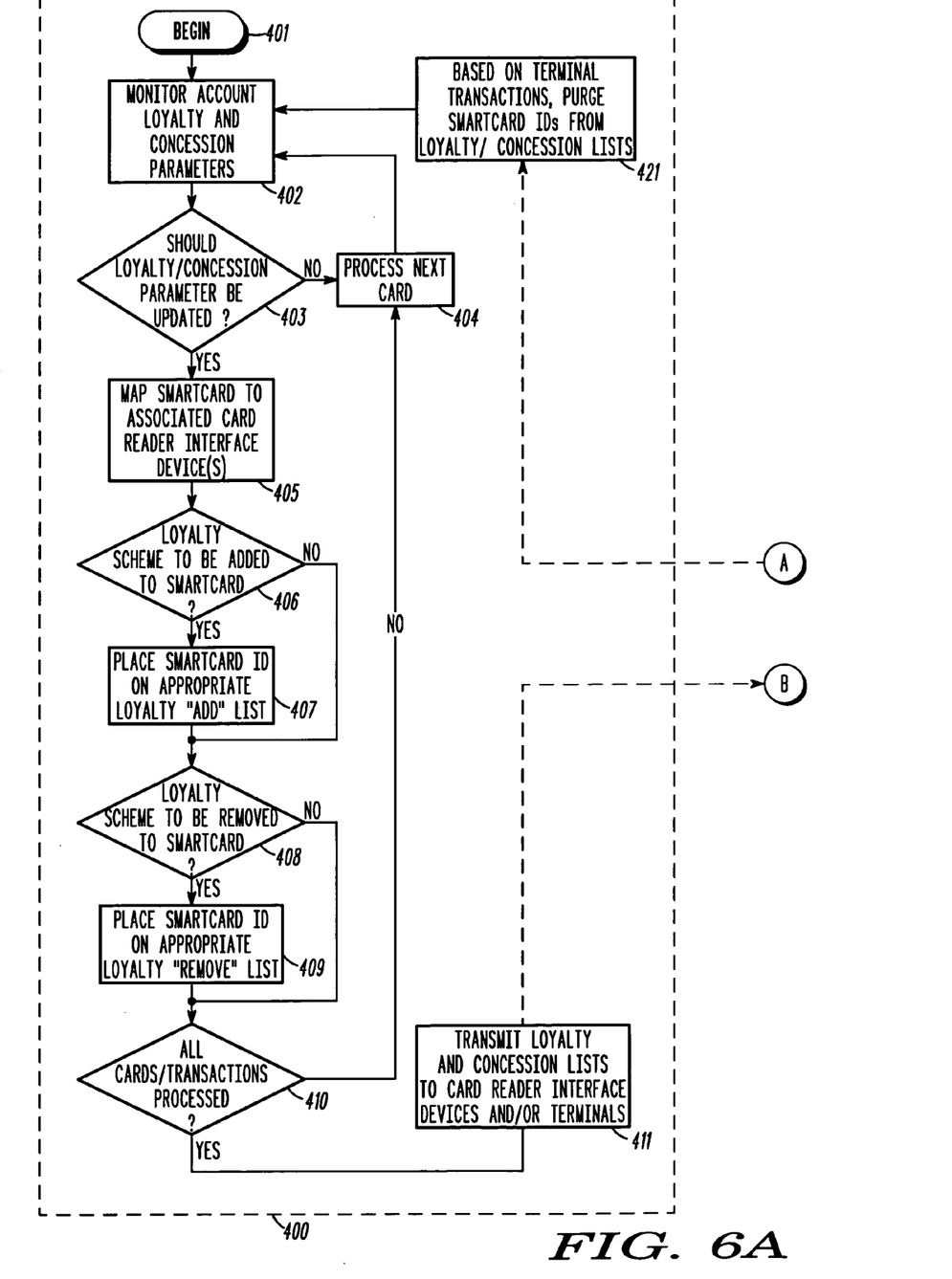
FIGS. 6A and 6B illustrate a flow chart depicting regulation of concession eligibility in accordance with the alternative embodiment of the present invention.
Figure 6B:
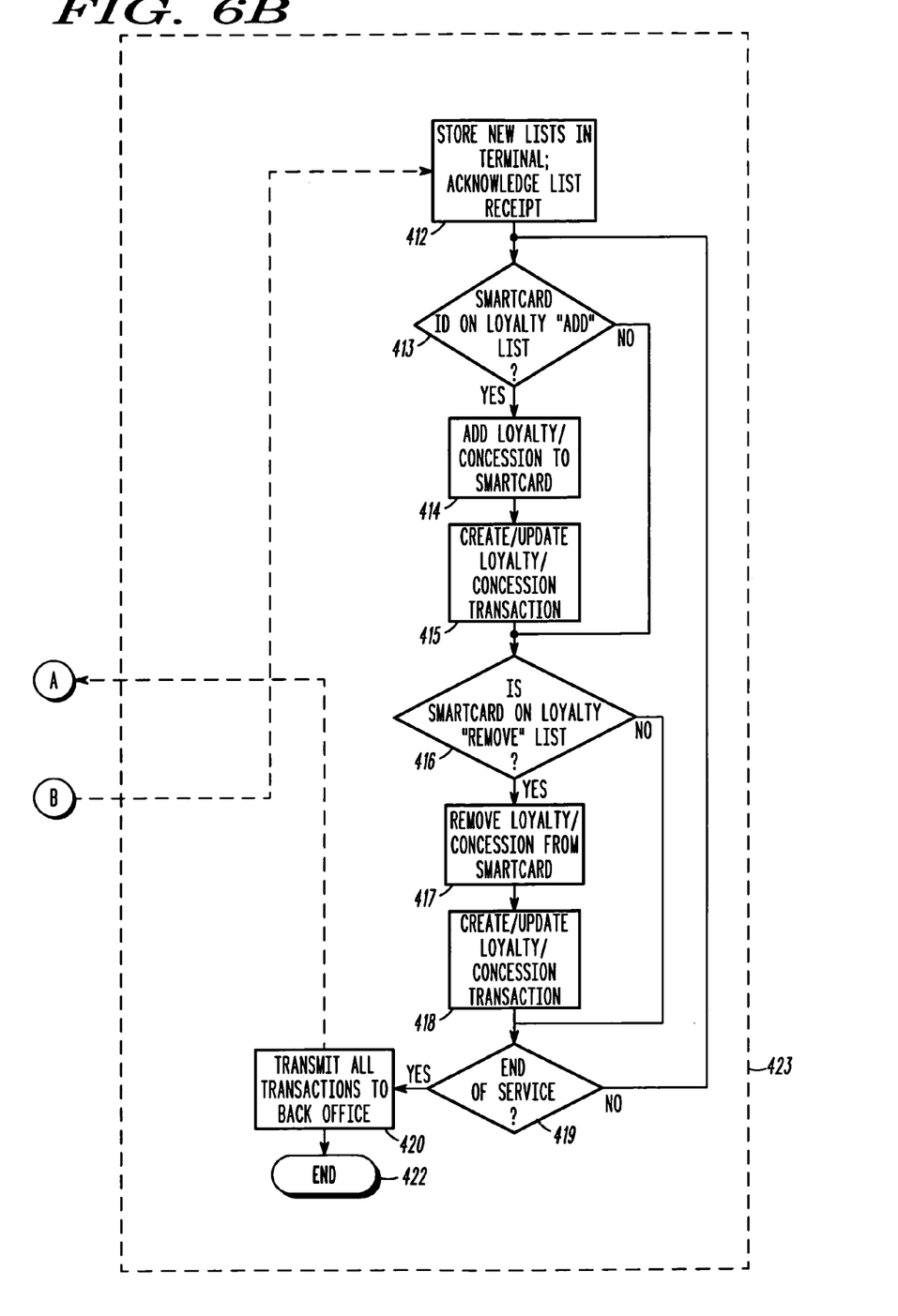

FIGS. 6A and 6B illustrate a flowchart of the alternative embodiment of the present invention depicting loyalty and concessions processing. Processing begins 401 within a back office system 400 that comprises one or more computer systems employing one or more databases that monitor 402 the concession and loyalty parameters of the smart cards in the system. For each card, the back office system 400 determines 403 whether a loyalty or concession parameter should be updated on the smart card. If no parameter update is required, the next card is processed 404. A person of ordinary skill in the art can readily appreciate that a transaction list can drive the selection of cards selected for parameter update, rather than selecting cards sequentially by the UID of the smart card.

If the back office system 400 determines 403 that a smart card requires concession/loyalty parameter update, the back office system 400 maps 405 the UID of the smart card to an associated reader interface device for later transmission 411 of information to the card acceptance location 423. This mapping may occur at any step between step 403 and step 411.

If the back office system 400 determines 406 that the card needs to be updated by adding a parameter to the card, it places 407 the UID of the smart card on the appropriate loyalty/concession "add" list. If the back office system 400 determines 408 that the smart card needs to be updated by removing a parameter from the smart card, it places 409 the UID of the smart card on the appropriate loyalty/concession "remove" list. The pair of steps 406, 407 may be interchanged with the pair 408, 409 without changing the transmission 411 of data from the back office system 400 to the card acceptance location 423.

If smart cards or transactions remain 410 unprocessed that would update loyalty/concession parameters on the smart cards, they are processed beginning at step 404, and proceeding to steps 402, 403, 404, 405, 406, 407, 408, 409 and 410. When the back office system 400 has processed 410 all cards and/or transactions that require loyalty/concession parameter updates to the smart cards, it transmits 411 the "add" list created in step 407 and the "remove" list created in step 409 to the card acceptance locations 423, via any existing card reader interface devices, as determined at step 405.

Upon receiving the "add" and "remove" lists, the card acceptance location stores 412 the lists in its memory and acknowledges their receipt and storage 412 to the back office system 400. The card acceptance location then processes each smart card presented to it.

The card acceptance location queries 413 the stored lists to determine whether a presented smart card is on a loyalty/concession "add" list. If the presented card is on an "add" list, the card acceptance location issues a command 414 to the smart card to update the loyalty/concession parameter on the smart card. The card acceptance location records 415 the update in memory as a loyalty/concession transaction.

The card acceptance location 423 queries 416 the stored lists to determine whether a presented smart card is on a loyalty/concession "remove" list. If the presented smart card is on a "remove" list, the card acceptance location 423 issues a command 417 to the smart card to remove the loyalty/concession parameter from the smart card. The card acceptance location 423 records 418 the update in memory as a loyalty/concession transaction. Depending on business rules governing the order of processing "add" and "remove" loyalty/concession transactions, the steps 413, 414 and 415 may be interchanged with steps 416, 417 and 418.

If the card acceptance location 423 is at the end of its service period 419, it transmits 420 all transactions created during its service period to the back office system 400. If the card acceptance location 423 is not at the end of its service period 419, it continues to process presented smart cards as in steps 413, 414, 415, 416, 417 and 418. The back office system 400 purges 421 the UID of the smart card from its loyalty/concession "add" and "remove" lists based on the transactions recorded by the card acceptance location 423 in steps 415 and 418. When the card acceptance location 423 has transmitted 420 its transactions to the back office system 400, it ends 422 processing of loyalty/concession transactions until the next service period.

Figure 7:
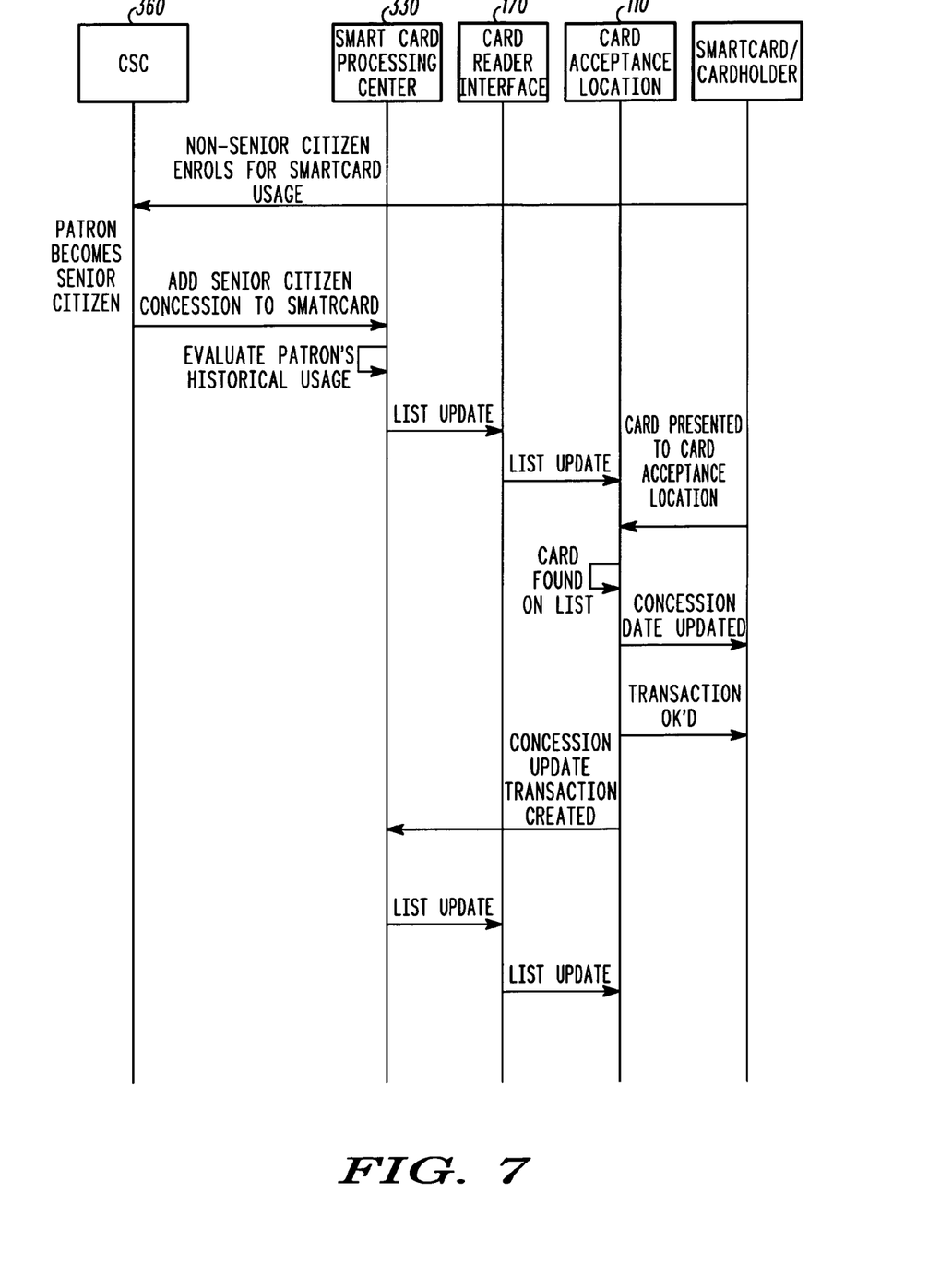
FIG. 7 illustrates a bounce diagram of regulating concession eligibility in accordance with the alternative embodiment of the present invention.

FIG. 7 illustrates a bounce diagram of regulating concession eligibility in accordance with the alternative embodiment of the present invention. In light of the above description of the alternative embodiment, FIG. 7 is self-explanatory and will not be discussed in detail.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. For example, the smart card system in the various embodiments may have more or less system components, or the components may perform different functions. The smart card systems may have abroad range of applications that they can be used for. These may include, but certainly not limited to, access control, medical record applications, banking, currency replacement systems, transit or mobility, secure access to the intranet and internet, ad the like. Thus, it should be understood that the invention is not limited by the foregoing description, but embraces all such alterations, modifications and variations in accordance with the spirit and scope of the appended claims.

We claim:

1. A method of regulating usage in a smart card system, the method comprising the steps of:
   at a card acceptance location:
   detecting a presence of a smart card, the smart card having status data;
   determining an identification code of the smart card;
   determining if the smart card was previously disabled;
   checking the identification code against a list stored locally at the card acceptance location, wherein the list is received from a second device; and
   if the identification code of the smart card is listed on the list, enabling the smart card, wherein enabling comprises at least one of the steps of changing the status data in the smart card to indicate enabled and unblocking an area of memory located within the smart card.

2. The method of claim 1 wherein the step of checking the identification code against a list stored locally at the card acceptance location is performed only if the smart card was determined to be previously disabled.

3. The method of claim 1 further comprising the step of, only after the step of enabling is completed, transmitting a request to the second device to purge the identification code of the smart card that the action was performed on from the list.

4. The method of claim 1 further comprising the step of modifying a parameter to the smart card which indicates one of the following: a discount, a rebate, a free purchase, and a free fare.

5. The method of claim 1 wherein the list comprises identification codes of smart cards that were previously denied access to participate in the smart card system but are currently deemed eligible to participate in the smart card system.

6. The method of claim 1 wherein the smart card has a status bit and a blocking status, and further comprising the steps of:
   determining whether the status bit and the blocking status are consistent, wherein the status bit and the blocking status are consistent in one of the following events: when the status bit is enabled and the blocking status is unblocked, and when the status bit is disabled and the blocking status is blocked; and
   if the status bit and the blocking status are inconsistent, disabling the smart card.

7. The method of claim 1, wherein the status data is a status bit.

8. The method of claim 4 wherein the parameter is based on at least one of the following: a validity period of a concession, a type of concession, a loyalty program, a validity period of a loyalty program, accrued loyalty points, a birth date, financial status, cardholder service area, cardholder purchase level, cardholder usage level, a set of criteria set by a service provider, a set of criteria set by a system owner, and a set of criteria set by a system operator.

9. A method of regulating smart card usage in a smart card system, the method comprising the steps of:
   compiling a first list of smart cards;
   transmitting the first list to a set of card acceptance locations, wherein the first list is stored locally at each card acceptance location in the set;
   receiving a second list of smart cards from each card acceptance location in the set, wherein the card acceptance location has performed an action on each smart card listed on its respective second list;

if the smart card is listed on the second list and the first list, purging the smart card from the first list; and if the smart card is listed on the second list but is not listed on the first list, adding the smart card to the first list.

10. The method of claim 9 wherein the smart cards listed on the first list are selected from a group consisting of: smart card deemed ineligible to participate in the smart card system; smart card that were previously ineligible to participate in the smart card system, but have been currently deemed eligible to participate in the smart card system; and smart cards that require a concession update.

11. The method of claim 9 further comprising the steps of:
updating the first list; and
transmitting the updated first list to the set of card acceptance locations.

12. The method of claim 9 further comprising the step of receiving an acknowledgement that the set of card acceptance locations successfully received the first list.

13. The method of claim 9 wherein the set of card acceptance locations are in a given geographical area.

14. The method of claim 9 wherein the set of card acceptance locations are mapped to a given service provider.

15. The method of claim 9 further comprising the steps of reducing the first list of smart cards in size by at least one of the following criteria;

compiling the first list based on a given geographic location of the card acceptance locations;

compiling the first list based on smart cards having at least a given monetary value associated therewith;

compiling the first list based on smart cards having at least a given monetary value contained thereon;

compiling the first list based on a potential fraud value;

compiling the first list based on recent attempts to use a disabled smart card; and compiling the first list based on a size of available memory at a card acceptance location.

16. The method of claim 9 wherein the step of compiling a first list of smart cards is based on at least one of the following criteria:

cardholder financial status;

smart card usage anomalies;

smart card lost/stolen status; and account operational status.

17. The method of claim 12 further comprising retransmitting the first list to the set of card acceptance locations if the acknowledgement was not received.

* * * * *